US011834961B2

(12) United States Patent
Barker (10) Patent No.: US 11,834,961 B2
(45) Date of Patent: Dec. 5, 2023

(54) COOLANT TRANSFER SYSTEM AND METHOD FOR A DUAL-WALL AIRFOIL

(71) Applicant: Rolls-Royce Corporation, Indianapolis, IN (US)

(72) Inventor: Brett Barker, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 0 days.

(21) Appl. No.: 18/162,108

(22) Filed: Jan. 31, 2023

(65) Prior Publication Data
US 2023/0175403 A1 Jun. 8, 2023

Related U.S. Application Data

(62) Division of application No. 17/501,277, filed on Oct. 14, 2021, now Pat. No. 11,598,215.

(51) Int. Cl.
*F01D 5/18* (2006.01)

(52) U.S. Cl.
CPC .......... *F01D 5/181* (2013.01); *F05D 2220/32* (2013.01); *F05D 2240/30* (2013.01); *F05D 2260/20* (2013.01)

(58) Field of Classification Search
CPC ........ F01D 5/181; F01D 5/18; F05D 2260/20; F05D 2220/32; F05D 2240/30
See application file for complete search history.

(56) References Cited

U.S. PATENT DOCUMENTS

| | | |
|---|---|---|
| 3,240,468 A | 3/1966 | Watts et al. |
| 6,582,186 B2 | 6/2003 | Manzoori et al. |
| 7,080,971 B2 | 7/2006 | Wilson et al. |
| 8,500,405 B1 | 8/2013 | Jones et al. |
| 8,684,668 B1 * | 4/2014 | Jones ...................... F01D 9/065 415/115 |
| 9,611,755 B2 * | 4/2017 | Memmen ................ F01D 25/12 |
| 9,840,930 B2 * | 12/2017 | Lee .......................... F01D 9/065 |
| 9,863,256 B2 * | 1/2018 | Lee .......................... F01D 9/065 |
| 10,060,264 B2 | 8/2018 | Moga et al. |
| 10,450,873 B2 * | 10/2019 | Barker ..................... F01D 5/186 |
| 10,830,056 B2 * | 11/2020 | Erno ....................... F01D 9/065 |
| 10,837,314 B2 | 11/2020 | Varney et al. |
| 11,396,819 B2 * | 7/2022 | Mongillo, Jr. .......... F01D 5/189 |
| 11,598,215 B1 * | 3/2023 | Barker ..................... F01D 5/187 |
| 2010/0247329 A1 | 9/2010 | Morgan |

(Continued)

*Primary Examiner* — David E Sosnowski
*Assistant Examiner* — Theodore C Ribadeneyra
(74) *Attorney, Agent, or Firm* — Crowell & Moring LLP (57) ABSTRACT

A dual-wall airfoil configured for coolant transfer includes a spar having a pressure side wall and a suction side wall each including raised features on an outer surface thereof. An interior of the spar includes coolant cavities. An inner surface of a pressure side coversheet is in contact with the raised features on the outer surface of the pressure side wall so as to define pressure side flow pathways between the pressure side wall and the pressure side coversheet, and an inner surface of a suction side coversheet is in contact with the raised features on the outer surface of the suction side wall so as to define suction side flow pathways between the suction side wall and the suction side coversheet. The pressure side flow pathways and/or the suction side flow pathways include cooling circuit(s) configured to transfer coolant between the coolant cavities.

13 Claims, 4 Drawing Sheets

(56) References Cited

U.S. PATENT DOCUMENTS

| | | |
|---|---|---|
| 2012/0163994 A1 | 6/2012 | Kwon |
| 2015/0093252 A1 | 4/2015 | Papple |
| 2016/0215627 A1 | 7/2016 | Roberge et al. |
| 2016/0222822 A1 | 8/2016 | Jennings |
| 2017/0030199 A1 | 2/2017 | Barker et al. |
| 2017/0211395 A1 | 7/2017 | Heffernan et al. |
| 2018/0128111 A1 | 5/2018 | Koenig et al. |
| 2018/0135424 A1 | 5/2018 | Barker et al. |
| 2018/0163554 A1 | 6/2018 | O'Leary |
| 2018/0202295 A1 | 7/2018 | Rhodes et al. |
| 2018/0230833 A1 | 8/2018 | Kush |
| 2018/0274377 A1 | 9/2018 | Kington et al. |
| 2018/0320525 A1 | 11/2018 | Clum et al. |
| 2019/0032493 A1 | 1/2019 | Barker et al. |
| 2020/0011199 A1 | 1/2020 | Varney et al. |
| 2020/0049016 A1 | 2/2020 | Barker et al. |

\* cited by examiner

COOLANT TRANSFER SYSTEM AND METHOD FOR A DUAL-WALL AIRFOIL

RELATED APPLICATIONS

This application is a division of U.S. patent application Ser. No. 17/501,277, which was filed on Oct. 14, 2021, and is hereby incorporated by reference in its entirety.

TECHNICAL FIELD

This disclosure relates generally to airfoils with dual-wall cooling and more particularly to a coolant transfer system and method for a dual-wall airfoil.

BACKGROUND

Gas turbine engines include a compressor, combustor and turbine in flow series along a common shaft. Compressed air from the compressor is mixed with fuel in the combustor to generate hot combustion gases that rotate the turbine blades and drive the compressor. Improvements in the thrust and efficiency of gas turbine engines are linked to increasing turbine entry temperatures, which places a heavy burden on turbine blades. Consequently, there is significant interest in developing improved cooling techniques for airfoils in gas turbine engines. Dual-wall or double-wall cooling configurations are promising advancements for the cooling of turbine blades and nozzle guide vanes.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

A dual-wall or double-wall airfoil for a gas turbine engine may include a hollow spar that is partially or completely surrounded by suction side and pressure side coversheets (or "skins") and spaced apart from the coversheets by raised features on the outer surface of the spar. These raised features may include pedestals and/or rails arranged to define flow pathways for coolant (e.g., air) between the outer surface of the spar and the respective coversheet. The coolant may provide heat transfer and cooling as it traverses the flow pathways before exiting, typically through exit holes in the respective coversheet or through exit slots. The coolant is delivered into the flow pathways from coolant cavities in the spar that are fed through inlets at the base of the spar. In some situations, one of the inlets, typically the inlet that feeds into the coolant cavity nearest to the trailing edge, may be partially or completely blocked by other component(s), such that coolant flow into that particular coolant cavity is inhibited or prevented. In this disclosure, selected flow pathways between the outer surface of the spar and the coversheets are configured to transfer coolant from one coolant cavity to another, thereby ensuring that each coolant cavity is equipped to supply the coolant needed to different parts of the airfoil.

Figure 1A:
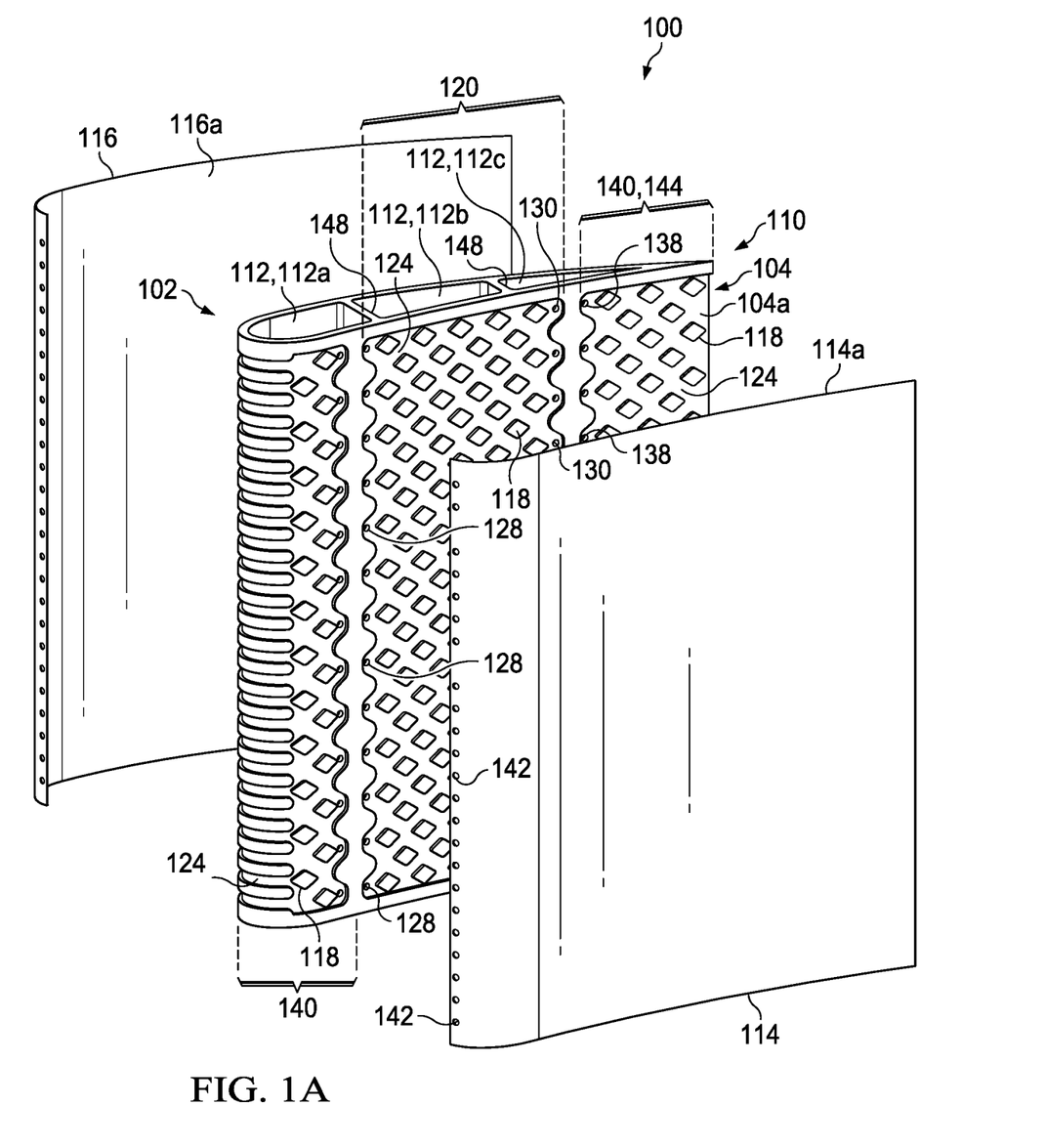
FIG. 1A is an exploded assembly view of the pressure side of an exemplary airfoil with dual-wall cooling and a pressure side cooling circuit configured for transfer of coolant between coolant cavities.
Figure 1B:
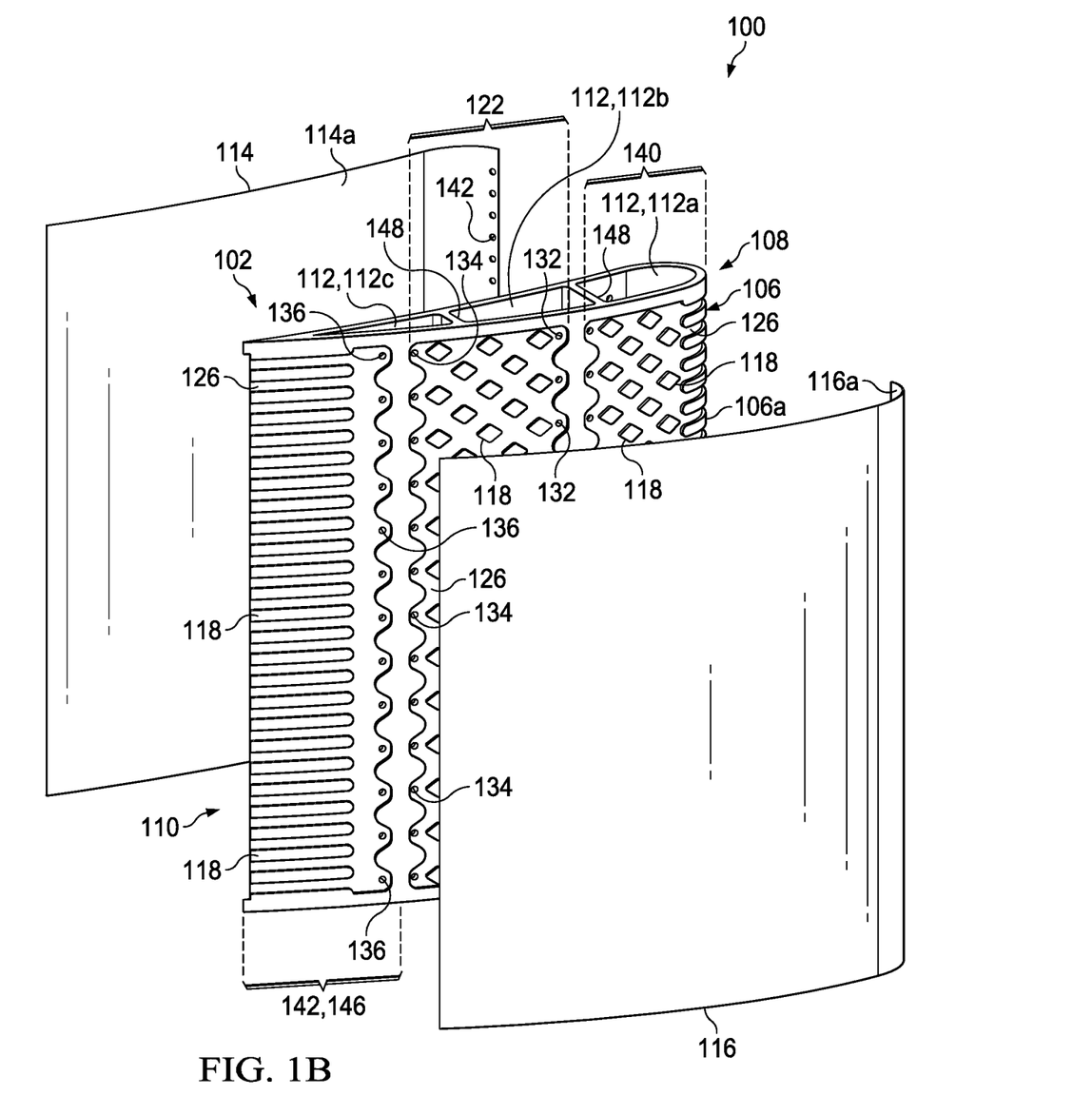
FIG. 1B is an exploded assembly view of the suction side of an exemplary airfoil with dual-wall cooling and a suction side cooling circuit configured for transfer of coolant between coolant cavities.

FIGS. 1A and 1B show pressure and suction sides, respectively, of an airfoil with dual-wall cooling that includes one or more cooling circuits for transfer of coolant between coolant cavities. The dual-wall airfoil 100 (which may alternately be referred to as "the airfoil 100") comprises a spar 102 having a pressure side wall 104 and a suction side wall 106 meeting at a leading edge 108 and a trailing edge 110 of the airfoil 100. Each of the pressure side wall 104 and the suction side wall 106 includes raised features 118 on an outer surface 104a, 106a thereof. A pressure side coversheet 114 overlies the pressure side wall 104, and an inner surface 114a of the pressure side coversheet 114 is in contact with (e.g., bonded to or integrally formed with) the raised features 118 on the outer surface 104a of the pressure side wall 104, thereby defining pressure side flow pathways 124 between the pressure side wall 104 and the pressure side coversheet 114. A suction side coversheet 116 overlies the suction side wall 106, and an inner surface 116a of the suction side coversheet 116 is in contact with (e.g., bonded to or integrally formed with) the raised features 118 on the outer surface 106a of the suction side wall 106, thereby defining suction side flow pathways 126 between the suction side wall 106 and the suction side coversheet 116. An interior of the spar 102 includes coolant cavities 112 for providing coolant to the pressure side and suction side flow pathways 124, 126 through inlet holes in the pressure and suction side walls 104, 106. For example, as shown in FIGS. 1A and 1B, the interior of the spar 102 may include three coolant cavities 112a, 112b, 112c separated by ribs 148 that extend across the interior from the pressure side wall 104 to the suction side wall 106. Alternatively, the interior of the spar 102 may include another number of coolant cavities 112, such as two, four, or five coolant cavities 112.

The raised features 118 may have a height that corresponds to the spacing between the outer surface 104a, 106a of the side wall 104, 106 and the respective coversheet 114, 116. Typically, the raised features 118 take the form of pedestals or rails. However, the raised features 118 shown on the pressure and suction sides of the airfoil 100 in FIGS. 1A and 1B are merely exemplary and may alternatively have different shapes, sizes, orientations and/or arrangements than those shown here, so long as pressure side and suction side flow pathways 124, 126 are defined.

Figure 2:
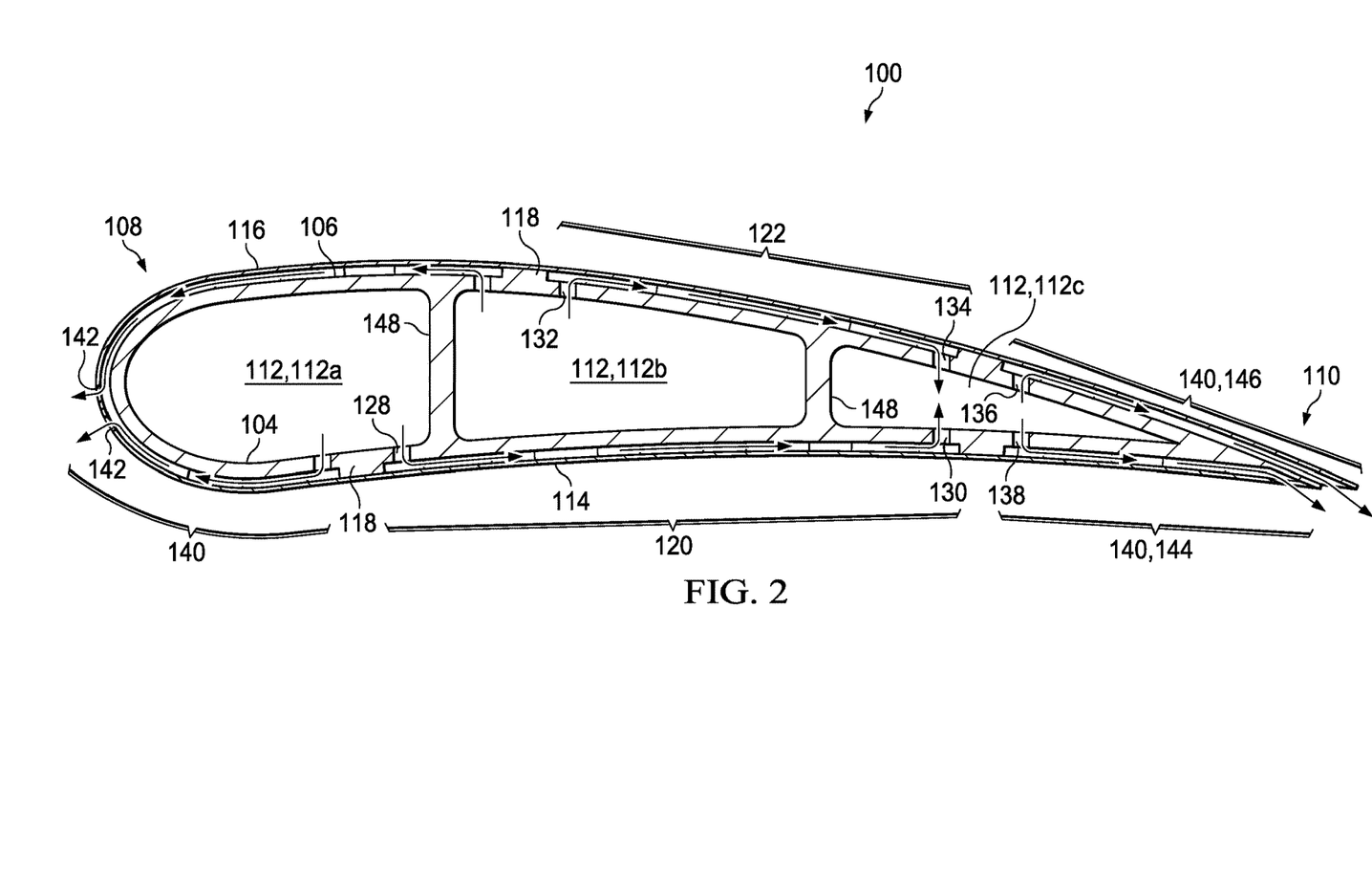
FIG. 2 is a cross-sectional view of the dual-wall airfoil of FIGS. 1A and 1B, with arrows to show flow pathways for coolant.

Referring to FIG. 2, the pressure side flow pathways 124 may include a pressure side cooling circuit 120 configured to direct coolant from one of the coolant cavities 112 (such as a first or second of the coolant cavities 112) into another of the coolant cavities 112. Also or alternatively, the suction side flow pathways 126 may include a suction side cooling circuit 122 configured to direct coolant from the first or second of the coolant cavities 112 into the other of the coolant cavities 112. It is noted that the term "first or second of the coolant cavities" 112 may refer to any of the coolant cavities 112 in the interior of the spar 102; for example, the term may be replaced with "leading edge or midspan coolant cavity 112a, 112b," "leading edge or trailing edge coolant cavity 112a, 112c," or with "midspan or trailing edge coolant cavity 112b, 112c." Similarly, the term "another of the coolant cavities" or "the other of the coolant cavities" may refer to the leading edge, midspan or trailing edge coolant cavity 112a, 112b, 112c. Since, as indicated above, the interior of the spar 102 may include more than three coolant cavities 112, it is recognized that there may be more than one midspan coolant cavity 112b. As shown by the arrows in FIG. 2, coolant in the suction side cooling circuit 122 and/or the pressure side cooling circuit 120 may travel toward the trailing edge 110 of the airfoil 100 before being directed into the other of the coolant cavities 112. Also or alternatively, coolant in the suction side cooling circuit 122 and/or the pressure side cooling circuit 120 may travel toward the leading edge 108 of the airfoil 100 before being directed into the other of the coolant cavities 112. As illustrated in FIGS. 1A and 1B, the pressure (or suction) side cooling circuit 120, 122 includes a portion of the raised features 118 on the pressure (or suction) side wall 104, 106.

Referring to the example of FIG. 2, the pressure side cooling circuit 120 is in fluid communication with the first or second of the coolant cavities 112, which may be a leading edge coolant cavity 112a (as illustrated) or a midspan coolant cavity 112b, via inlet holes 128 in the pressure side wall 104, and in fluid communication with the other of the coolant cavities 112, which may be a trailing edge coolant cavity 112c, via outlet holes 130 in the pressure side wall 104. The terms "inlet" and "outlet" are used to indicate the direction of coolant flow with respect to the pressure side cooling circuit 120, that is, whether the coolant is moving into or out of the cooling circuit 120. Accordingly, the outlet holes 130 are positioned downstream of the inlet holes 128. Also or alternatively, the outlet holes 130 may be positioned closer to the trailing edge than the inlet holes 128.

Similarly, the suction side cooling circuit 122 of this example is in fluid communication with the first or second of the coolant cavities 112, which may be the midspan coolant cavity 112b (as shown) or the leading edge coolant cavity 112a, via inlet holes 132 in the suction side wall 106, and in fluid communication with the other of the coolant cavities 112, which may be the trailing edge coolant cavity 112c, via outlet holes 134 in the suction side wall 106. As above, the terms "inlet" and "outlet" are used to indicate the direction of coolant flow with respect to the cooling circuit 122, that is, whether the coolant is moving into or out of the cooling circuit 122, respectively. Accordingly, the outlet holes 134 are positioned downstream of the inlet holes 132. Also or alternatively, the outlet holes 134 may be positioned closer to the trailing edge than the inlet holes 132.

Other pressure side and/or suction side cooling circuits 140 may be configured to direct coolant from one of the coolant cavities 112, through the respective cooling circuit to effect heat transfer, and then out of the airfoil 100 (instead of between coolant cavities 112). Such cooling circuits 140 are fed by different inlet holes than the pressure side and suction side cooling circuits 120, 122 described above. The coolant in the other cooling circuits 140 may flow in any desired direction (e.g., toward the leading edge 108 or toward the trailing edge 110) before exiting the airfoil 100 (e.g., through exit holes 142 in the pressure and/or suction side coversheets 114, 116).

For example, referring to FIG. 1A and FIG. 2, there may be a PS trailing edge cooling circuit 144 between the pressure side cooling circuit 120 and the trailing edge 110 of the airfoil. The PS trailing edge cooling circuit 144 may be fed by coolant from the trailing edge coolant cavity 112c via additional inlet holes 138 in the pressure side wall 104. Without the pressure side cooling circuit 120 to transfer coolant from the leading edge or midspan coolant cavity 112a, 112b to the trailing edge coolant cavity 112c, it might not be possible to provide sufficient coolant to the PS trailing edge cooling circuit 144. Also, as shown in FIG. 1B and FIG. 2, there may be a SS trailing edge cooling circuit 146 between the suction side cooling circuit 122 and the trailing edge 110 of the airfoil. The SS trailing edge cooling circuit 146 may be fed by coolant from the trailing edge coolant cavity 112c via additional inlet holes 136 in the suction side wall 106. Without the suction side cooling circuit 122 to transfer coolant from the leading edge or midspan coolant cavity 112a, 112b to the trailing edge coolant cavity 112c, it might not be possible to provide sufficient coolant to the SS trailing edge cooling circuit 146.

Also described in this disclosure is a method of cooling an airfoil that includes providing (as shown in FIGS. 1A and 1B and described above): a spar 102 having a pressure side wall 104 and a suction side wall 106 meeting at a leading edge 108 and a trailing edge 110 of the airfoil 100, where each of the pressure side wall 104 and the suction side wall 106 includes raised features 118 on an outer surface 104a, 106a thereof; a pressure side coversheet 114 overlying the pressure side wall 104, where an inner surface of the pressure side coversheet 114 is in contact with (e.g., bonded to or integrally formed with) the raised features 118 on the outer surface 104a of the pressure side wall 104, thereby defining pressure side flow pathways 124 between the pressure side wall 104 and the pressure side coversheet 114; and a suction side coversheet 116 overlying the suction side wall 106, where an inner surface 116a of the suction side coversheet 116 is in contact with (e.g., bonded to or integrally formed with) the raised features 118 on the outer surface 106a of the suction side wall 106, thereby defining suction side flow pathways 126 between the suction side wall 106 and the suction side coversheet 116. An interior of the spar 102 includes coolant cavities 112 for providing coolant to the pressure side and suction side flow pathways 124, 126, which may include a pressure side cooling circuit 120 and/or a suction side cooling circuit 122. The method further includes delivering coolant from a first and/or a second of the coolant cavities 112 into another of the coolant cavities 112 through the pressure side and/or the suction side cooling circuit 120, 122. As above, it is noted that the term "first and/or a second of the coolant cavities" 112 may refer to any of the coolant cavities 112 in the interior of the spar 102; for example, the term may be replaced with "leading edge coolant cavity 112a and/or midspan coolant cavity 112b," "leading edge coolant cavity 112a and/or trailing edge coolant cavity 112c," or with "midspan coolant cavity 112b and/or trailing edge coolant cavity 112c." Similarly, the term "another of the coolant cavities" or "the other of the coolant cavities" may refer to the leading edge, midspan or trailing edge coolant cavity 112a, 112b, 112c. Since, as indicated above, the interior of the spar 102 may include more than three coolant cavities 112, it is recognized that there may be more than one midspan coolant cavity 112b.

In one example, the coolant may be delivered from the leading edge coolant cavity 112a and/or the midspan coolant cavity 112b into the trailing edge coolant cavity 112c via the pressure side and/or suction side cooling circuits 120, 122. Accordingly, delivering the coolant through the pressure side cooling circuit 120 and/or the suction side cooling circuit 122 may comprise directing the coolant toward the trailing edge 110 of the airfoil 100. In another example, the coolant may be delivered from the trailing edge coolant cavity 112c and/or the midspan coolant cavity 112b into the leading edge coolant cavity 112a via the pressure side and/or the suction side cooling circuits 120, 122. Accordingly, delivering the coolant through the pressure side cooling circuit 120 and/or the suction side cooling circuit 122 may comprise directing the coolant toward the leading edge 108 of the airfoil 100.

As described above, the pressure side cooling circuit 120 may be in fluid communication with the first or second of the coolant cavities 112, which may be the leading edge coolant cavity 112a or the midspan coolant cavity 112b, via inlet holes 128 in the pressure side wall 104, and in fluid communication with the other of the coolant cavities 112, which may be the trailing edge coolant cavity 112c, via outlet holes 130 in the pressure side wall 104. Similarly, the suction side cooling circuit 122 may be in fluid communication with the first or second of the coolant cavities 112, which may be the midspan coolant cavity 112b or the leading edge coolant cavity 112a, via inlet holes 132 in the suction side wall 106, and in fluid communication with the other of the coolant cavities 112, which may be the trailing edge coolant cavity 112c, via outlet holes 134 in the suction side wall 106.

The pressure side and suction side cooling circuits 120, 122 may work in tandem; for example, the coolant may be delivered from the leading edge coolant cavity 112a into the trailing edge coolant cavity 112c through the pressure side cooling circuit 120, while the coolant is delivered from the midspan coolant cavity 112b into the trailing edge coolant cavity 112c through the suction side cooling circuit 122, as illustrated in FIG. 2. Alternatively, the coolant may be delivered from the midspan coolant cavity 112b into the trailing edge coolant cavity 112c through the pressure side cooling circuit 120, while the coolant is delivered from the leading edge coolant cavity 112a into the trailing edge coolant cavity 112c through the suction side cooling circuit 122.

Also, as described above, the pressure side wall 104 may include additional inlet holes 138 in fluid communication with the trailing edge coolant cavity 112c, and the method may further comprise delivering the coolant from the trailing edge coolant cavity 112c into a PS trailing edge cooling circuit 144. Also or alternatively, the suction side wall 106 may include additional inlet holes 136 in fluid communication with the trailing edge coolant cavity 112c, and the method may further comprise delivering the coolant from the trailing edge coolant cavity 112c into a SS trailing edge cooling circuit 146. Delivery of the coolant from the trailing edge coolant cavity 112c into the trailing edge cooling circuit(s) 144, 146 may occur only after the coolant has been delivered from the leading edge coolant cavity 112a and/or the midspan coolant cavity 112b.

The dual-wall airfoil 100 described herein may be fabricated using investment casting and diffusion bonding methods known in the art, such as described in U.S. Pat. No. 6,003,754, entitled "Airfoil for a Gas Turbine Engine and Method of Manufacture," which is hereby incorporated by reference in its entirety. The airfoil 100, including the spar 102 and the pressure and suction side coversheets 114, 116, may be formed from one or more materials that have high melting points, good oxidation/corrosion resistance and high-temperature strength. For example, a nickel-base alloy, a titanium-base alloy, and/or an iron-base alloy may be suitable. The alloy may have an equiaxed, directionally solidified, or single-crystal microstructure. The raised features 118 may be integrally formed with the airfoil 100, or, more specifically, may be integrally formed on the respective suction or pressure side wall 106, 104. The raised features 118 may be bonded to or integrally formed with the respective suction or pressure side coversheet 120, 140. The airfoil 100 may have a single-piece or a multi-piece construction.

Figure 3:
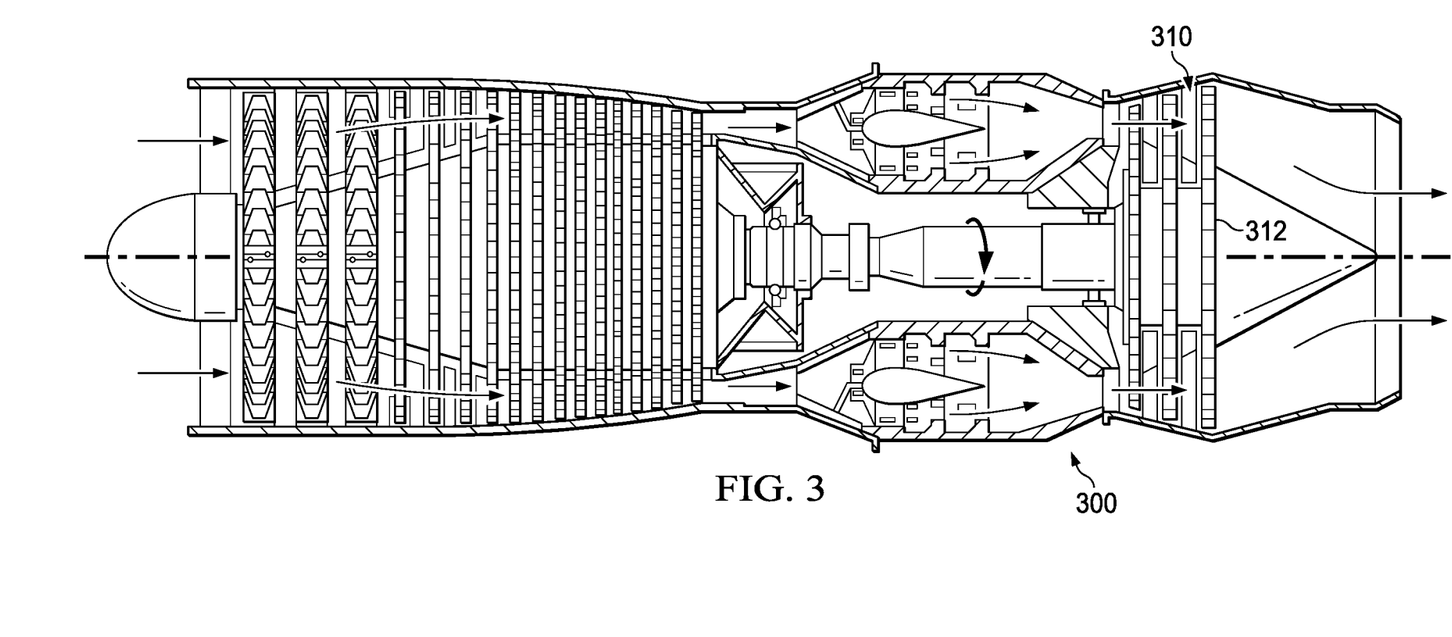
FIG. 3 is a cross-sectional view of an exemplary gas turbine engine that may include the airfoil described in this disclosure.

A gas turbine engine 300, such as that shown in FIG. 3, may include the airfoil 100 described above, e.g., as a nozzle guide vane or a turbine blade 312 in the turbine section 310. In some examples, the gas turbine engine 300 may supply power to and/or provide propulsion of an aircraft, e.g., a helicopter, an airplane, an unmanned space vehicle, a fixed wing vehicle, a variable wing vehicle, a rotary wing vehicle, an unmanned combat aerial vehicle, a tailless aircraft, a hover craft, and/or an extraterrestrial (spacecraft) vehicle. Also or alternatively, the gas turbine engine 300 may be utilized in a configuration unrelated to an aircraft such as, for example, an industrial application, an energy application, a power plant, a pumping set, a marine application (for example, for naval propulsion), a weapon system, a security system, a perimeter defense or security system.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a dual-wall airfoil configured for coolant transfer, the airfoil comprising: a spar having a pressure side wall and a suction side wall meeting at a leading edge and a trailing edge of the airfoil, each of the pressure side wall and the suction side wall including raised features on an outer surface thereof, an interior of the spar including coolant cavities; a pressure side coversheet overlying the pressure side wall, an inner surface of the pressure side coversheet being in contact with the raised features on the outer surface of the pressure side wall, thereby defining pressure side flow pathways between the pressure side wall and the pressure side coversheet; a suction side coversheet overlying the suction side wall, an inner surface of the suction side coversheet being in contact with the raised features on the outer surface of the suction side wall, thereby defining suction side flow pathways between the suction side wall and the suction side coversheet; wherein the pressure side flow pathways include a pressure side cooling circuit configured to direct coolant from a first or second of the coolant cavities into another of the coolant cavities, and/or wherein the suction side flow pathways include a suction side cooling circuit configured to direct coolant from the first or second of the coolant cavities into the other of the coolant cavities.

A second aspect relates to the airfoil of the first aspect, wherein the pressure side cooling circuit is in fluid communication with the first or second of the coolant cavities via inlet holes in the pressure side wall, and in fluid communication with the other of the coolant cavities via outlet holes in the pressure side wall.

A third aspect relates to the airfoil of the first or second aspect, wherein the suction side cooling circuit is in fluid communication with the first or second of the coolant cavities via inlet holes in the suction side wall, and in fluid communication with the other of the coolant cavities via outlet holes in the suction side wall.

A fourth aspect relates to the airfoil of any preceding aspect, wherein the coolant in the suction side cooling circuit and/or the pressure side cooling circuit travels toward the leading edge of the airfoil before being directed into the other of the coolant cavities.

A fifth aspect relates to the airfoil of any preceding aspect, wherein the first or second of the coolant cavities comprises a trailing edge coolant cavity or a midspan coolant cavity, and wherein the other of the coolant cavities is a leading edge coolant cavity.

A sixth aspect relates to the airfoil of any preceding aspect, wherein the coolant in the suction side cooling circuit and/or the pressure side cooling circuit travels toward the trailing edge of the airfoil before being directed into the other of the coolant cavities.

A seventh aspect relates to the airfoil of any preceding aspect, wherein the first or second of the coolant cavities comprises a leading edge coolant cavity or a midspan coolant cavity, and wherein the other of the coolant cavities is a trailing edge coolant cavity.

An eighth aspect relates to the airfoil of the seventh aspect, wherein the pressure side cooling circuit is in fluid communication with the leading edge coolant cavity via inlet holes in the pressure side wall, and in fluid communication with the trailing edge coolant cavity via outlet holes in the pressure side wall.

A ninth aspect relates to the airfoil of the eighth aspect, wherein the pressure side wall includes additional inlet holes in fluid communication with the trailing edge coolant cavity for delivering the coolant from the trailing edge coolant cavity into a PS trailing edge cooling circuit.

A tenth aspect relates to the airfoil of the seventh aspect, wherein the suction side cooling circuit is in fluid communication with the midspan coolant cavity via the inlet holes in the suction side wall, and in fluid communication with the trailing edge coolant cavity via the outlet holes in the suction side wall.

An eleventh aspect relates to the airfoil of the tenth aspect, wherein the suction side wall includes additional inlet holes in fluid communication with the trailing edge coolant cavity for delivering the coolant from the trailing edge coolant cavity into a SS trailing edge cooling circuit.

A twelfth aspect relates to the airfoil of any preceding aspect, wherein the suction side cooling circuit includes at least a portion of the raised features on the suction side wall, and/or wherein the pressure side cooling circuit includes at least a portion of the raised features on the pressure side wall.

A thirteenth aspect relates to a gas turbine engine including the airfoil of any preceding aspect.

A fourteenth aspect relates to a method of transferring coolant in a dual-wall airfoil, the method comprising providing an airfoil comprising: a spar having a pressure side wall and a suction side wall meeting at a leading edge and a trailing edge of the airfoil, each of the pressure side wall and the suction side wall including raised features on an outer surface thereof, an interior of the spar including coolant cavities; a pressure side coversheet overlying the pressure side wall, an inner surface of the pressure side coversheet being in contact with the arrangement of raised features on the outer surface of the pressure side wall, thereby defining pressure side flow channels between the pressure side wall and the pressure side coversheet; a suction side coversheet overlying the suction side wall, an inner surface of the suction side coversheet being in contact with the arrangement of raised features on the outer surface of the suction side wall, thereby defining suction side flow channels between the suction side wall and the suction side coversheet, wherein the pressure side flow channels include a pressure side cooling circuit, and/or wherein the suction side flow pathways include a suction side cooling circuit; delivering coolant from a first and/or a second of the coolant cavities into another of the coolant cavities through the pressure side and/or the suction side cooling circuit.

A fifteenth aspect relates to the method of the fourteenth aspect, wherein delivering the coolant through the pressure side and/or suction side cooling circuit comprises directing the coolant toward the leading edge of the airfoil.

A sixteenth aspect relates to the method of the fourteenth or the fifteenth aspect, wherein the first and/or the second of the coolant cavities comprises a trailing edge coolant cavity and/or a midspan coolant cavity, and wherein the other of the coolant cavities is a leading edge coolant cavity.

A seventeenth aspect relates to the method of any of the fourteenth through the sixteenth aspects, wherein delivering the coolant through the pressure side and/or suction side cooling circuit comprises directing the coolant toward the trailing edge of the airfoil.

An eighteenth aspect relates to the method of any of the fourteenth through the seventeenth aspects, wherein the first and/or the second of the coolant cavities comprises a leading edge coolant cavity and/or a midspan coolant cavity, and wherein the other of the coolant cavities is a trailing edge coolant cavity.

A nineteenth aspect relates to the method of the eighteenth aspect, wherein the coolant is delivered from the leading edge coolant cavity into the trailing edge coolant cavity through the pressure side cooling circuit.

A twentieth aspect relates to the method of the nineteenth aspect, wherein the pressure side cooling circuit is in fluid communication with the leading edge coolant cavity via inlet holes in the pressure side wall, and in fluid communication with the trailing edge coolant cavity via outlet holes in the pressure side wall.

A twenty-first aspect relates to the method of the twentieth aspect, wherein the pressure side wall includes additional inlet holes in fluid communication with the trailing edge coolant cavity; and further comprising delivering the coolant from the trailing edge coolant cavity into a PS trailing edge cooling circuit.

A twenty-second aspect relates to the method of any of the eighteenth through the twenty-first aspects, wherein the coolant is delivered from the midspan coolant cavity into the trailing edge coolant cavity through the suction side cooling circuit.

A twenty-third aspect relates to the method of the twenty-second aspect, wherein the suction side cooling circuit is in fluid communication with the midspan coolant cavity via inlet holes in the suction side wall, and in fluid communication with the trailing edge coolant cavity via outlet holes in the suction side wall.

A twenty-fourth aspect relates to the method of the twenty-third aspect, wherein the suction side wall includes additional inlet holes in fluid communication with the trailing edge coolant cavity; and further comprising delivering the coolant from the trailing edge coolant cavity into a SS trailing edge cooling circuit.

In addition to the features mentioned in each of the independent aspects enumerated above, some examples may show, alone or in combination, the optional features mentioned in the dependent aspects and/or as disclosed in the description above and shown in the figures.

What is claimed is:

1. A dual-wall airfoil configured for coolant transfer, the airfoil comprising:
   a spar having a pressure side wall and a suction side wall meeting at a leading edge and a trailing edge of the airfoil, each of the pressure side wall and the suction side wall including raised features on an outer surface thereof, an interior of the spar including coolant cavities;
   inlets at a base of the spar for feeding coolant into the coolant cavities, one of the inlets being partially or completely blocked such that coolant flow into one of the coolant cavities is inhibited or prevented;
   a pressure side coversheet overlying the pressure side wall, an inner surface of the pressure side coversheet being in contact with the raised features on the outer surface of the pressure side wall, thereby defining pressure side flow pathways between the pressure side wall and the pressure side coversheet;
   a suction side coversheet overlying the suction side wall, an inner surface of the suction side coversheet being in contact with the raised features on the outer surface of the suction side wall, thereby defining suction side flow pathways between the suction side wall and the suction side coversheet,
   wherein the pressure side flow pathways include a pressure side cooling circuit configured to direct coolant from a first or second of the coolant cavities into another of the coolant cavities, and/or
   wherein the suction side flow pathways include a suction side cooling circuit configured to direct coolant from the first or second of the coolant cavities into the other of the coolant cavities.

2. The airfoil of claim 1, wherein the pressure side cooling circuit is in fluid communication with the first or second of the coolant cavities via inlet holes in the pressure side wall, and in fluid communication with the other of the coolant cavities via outlet holes in the pressure side wall.

3. The airfoil of claim 1, wherein the suction side cooling circuit is in fluid communication with the first or second of the coolant cavities via inlet holes in the suction side wall, and in fluid communication with the other of the coolant cavities via outlet holes in the suction side wall.

4. The airfoil of claim 1, wherein the coolant in the suction side cooling circuit and/or the pressure side cooling circuit travels toward the leading edge of the airfoil before being directed into the other of the coolant cavities.

5. The airfoil of claim 1, wherein the first or second of the coolant cavities comprises a trailing edge coolant cavity or a midspan coolant cavity, and wherein the other of the coolant cavities is a leading edge coolant cavity.

6. The airfoil of claim 1, wherein the coolant in the suction side cooling circuit and/or the pressure side cooling circuit travels toward the trailing edge of the airfoil before being directed into the other of the coolant cavities.

7. The airfoil of claim 1, wherein the first or second of the coolant cavities comprises a leading edge coolant cavity or a midspan coolant cavity, and wherein the other of the coolant cavities is a trailing edge coolant cavity.

8. The airfoil of claim 7, wherein the pressure side cooling circuit is in fluid communication with the leading edge coolant cavity via inlet holes in the pressure side wall, and in fluid communication with the trailing edge coolant cavity via outlet holes in the pressure side wall.

9. The airfoil of claim 8, wherein the pressure side wall includes additional inlet holes in fluid communication with the trailing edge coolant cavity for delivering the coolant from the trailing edge coolant cavity into a PS trailing edge cooling circuit.

10. The airfoil of claim 7, wherein the suction side cooling circuit is in fluid communication with the midspan coolant cavity via the inlet holes in the suction side wall, and in fluid communication with the trailing edge coolant cavity via the outlet holes in the suction side wall.

11. The airfoil of claim 10, wherein the suction side wall includes additional inlet holes in fluid communication with the trailing edge coolant cavity for delivering the coolant from the trailing edge coolant cavity into a SS trailing edge cooling circuit.

12. The airfoil of claim 1, wherein the suction side cooling circuit includes at least a portion of the raised features on the suction side wall, and/or wherein the pressure side cooling circuit includes at least a portion of the raised features on the pressure side wall.

13. A gas turbine engine including the airfoil of claim 1.

* * * * *